United States Patent
Ning et al.

(10) Patent No.: US 11,091,252 B2
(45) Date of Patent: Aug. 17, 2021

(54) AIRCRAFT MULTI-WHEEL TRUCK BEAM POSITIONER

(71) Applicant: Safran Landing Systems Canada Inc., Ajax (CA)

(72) Inventors: James Ning, Oshawa (CA); Graeme Steel, Courtice (CA); Michael Lawson, Bowmanville (CA)

(73) Assignee: Safran Landing Systems Canada Inc., Ontario (CA)

( * ) Notice: Subject to any disclaimer, the term of this patent is extended or adjusted under 35 U.S.C. 154(b) by 188 days.

(21) Appl. No.: 16/526,645

(22) Filed: Jul. 30, 2019

(65) Prior Publication Data

US 2021/0031906 A1 Feb. 4, 2021

(51) Int. Cl.
*B64C 25/60* (2006.01)
*B64C 25/00* (2006.01)

(52) U.S. Cl.
CPC ........ *B64C 25/60* (2013.01); *B64C 2025/006* (2013.01); *B64C 2025/008* (2013.01)

(58) Field of Classification Search
CPC .............. B64C 25/60; B64C 2025/006; B64C 2025/008
See application file for complete search history.

(56) References Cited

U.S. PATENT DOCUMENTS

| | | | | |
|---|---|---|---|---|
| 4,359,199 | A * | 11/1982 | Kramer ................... | B64C 25/34 244/1 OOR |
| 4,720,063 | A * | 1/1988 | James ..................... | B64C 25/14 244/102 R |
| 4,892,270 | A * | 1/1990 | Derrien ................... | B64C 25/34 244/103 R |
| 8,382,032 | B2 * | 2/2013 | Bennett ................... | B64C 25/22 244/102 R |
| 8,448,900 | B2 * | 5/2013 | Mellor .................... | B64C 25/20 244/102 A |
| 8,991,753 | B2 | 3/2015 | Mellor et al. | |

(Continued)

FOREIGN PATENT DOCUMENTS

WO    2006/094145 A9    9/2006

OTHER PUBLICATIONS

International Search Report and Written Opinion dated Oct. 26, 2020, received in corresponding international application No. PCT/CA2020/051034, filed Jul. 28, 2020, 10 pages.

*Primary Examiner* — Philip J Bonzell
*Assistant Examiner* — Tye William Abell
(74) *Attorney, Agent, or Firm* — Christensen O'Connor Johnson Kindness PLLC (57) ABSTRACT

An aircraft landing gear includes a shock strut with a rod slidably received within a cylinder. A beam is rotatably mounted to the rod, and wheels are mounted to the beam. The landing gear further includes a link assembly with an upper link and a lower link. The upper link has a first end rotatably connected to the cylinder, and the lower link has a first end rotatably connected to the beam. The second ends of the upper and lower links are rotatably coupled to each other by a limiter joint. The limiter joint includes a first stop associated with the upper link and a second stop associated with the lower link. The stops are configured such that the first stop engages the second stop to limit rotation of the upper link relative to the lower link.

13 Claims, 5 Drawing Sheets

(56) References Cited

U.S. PATENT DOCUMENTS

| | | | |
|---|---|---|---|
| 2011/0233327 A1* | 9/2011 | Mellor | B64C 25/20 |
| | | | 244/102 A |
| 2012/0211600 A1* | 8/2012 | Mellor | B64C 25/00 |
| | | | 244/1 OOR |
| 2019/0002089 A1* | 1/2019 | Thompson | B64C 25/60 |

* cited by examiner

AIRCRAFT MULTI-WHEEL TRUCK BEAM POSITIONER

BACKGROUND

In order to accommodate nose-up rotation during takeoff, long-body aircraft require tall main landing gear to prevent the tail from impacting the ground. A common configuration utilizes a truck beam mounted to the aircraft fuselage by an elongate shock strut. Multiple wheels are mounted to the truck beam, which is rotatable relative to the shock strut to enable the wheels to maintain contact with the ground while the aircraft initially rotates during takeoff.

During landing, the truck beam is typically maintained in a predetermined "toe up" or "toe down" position just prior to touchdown. Touchdown is detected by sensors that sense rotation of the truck beam that occurs subsequent to the first wheel contacting the ground. That is, after the first wheel makes contact, the truck beam rotates into a generally horizontal position in which all of the wheels are in contact with the ground. It is also necessary to maintain the truck beam in the predetermined position when the aircraft is airborne to ensure that the main landing gear will fit within the landing gear bay when the gear is retracted.

Known truck beam positioners include active positioners, which utilize various types of actuators to control the position of the truck beam. U.S. Pat. No. 8,382,032 discloses one such active truck beam positioner, wherein an auxiliary actuator is connected to the landing gear strut and the truck beam. The auxiliary actuator is hydraulically energized to selectively change length, thereby controlling the angle of the truck beam relative to the strut.

Other truck beam positioner configurations are passive positioners, which rely on biasing elements, such as springs, and/or aerodynamic loads to position the truck beam. A passive positioner is disclosed in U.S. Pat. No. 4,892,270. The position of the truck beam is maintained by a spring loaded-telescopic link in combination with limiter incorporated in the torque link. The telescopic link extends between the shock strut and the truck beam and urges the forward end of the truck beam to rotate downward. At the same time, the limiter includes an abutment that bears against the shock strut to limit the downward rotation of the truck beam to lock the torque link and the landing gear in a bottom limit position.

Known passive and active truck beam positioners add weight, cost, complexity, and maintenance requirements to the aircraft.

SUMMARY

The disclosed technology relates to landing gear that utilizes a simplified, lightweight passive truck beam positioner that reduces cost, weight, and maintenance, while also increasing reliability as compared known positioning systems. A first representative embodiment of a disclosed aircraft landing gear includes a shock strut having a rod with a first end slidably disposed within a cylinder. A beam is rotatably coupled to a second end of the rod. The beam is configured to have at least a forward wheel and an aft wheel rotatably mounted thereto. The landing gear further includes a link assembly that has an upper link and a lower link. The upper link has a first end rotatably connected to the cylinder, and the lower link has a first end rotatably connected to the beam. The second end of the lower link is rotatably coupled to the second end of the upper link by a limiter joint. The limiter joint includes a first stop associated the upper link and a second stop associated with the lower link. The stops are configured such that the first stop engages the second stop to limit rotation of the upper link relative to the lower link.

In another embodiment, the limiter is selectively adjustable to provide a predetermined maximum distance between the first end of the upper link and the first end of the lower link.

In another embodiment, the first stop comprises a first tab extending from the first leg, and the second stop comprises a second tab extending from the second leg.

In another embodiment, the first stop further comprises a first contact fitting coupled to the first tab, the first contact fitting having a first contact surface configured to contact the second stop, wherein a position of the first contact surface is selectively adjustable relative to the first tab.

In another embodiment, the first contact fitting is a first threaded fastener threadedly coupled to the first tab.

In another embodiment, the second stop further comprises a second contact fitting coupled to the second tab, the second contact fitting having a second contact surface configured to contact the first stop, wherein the position of the second contact surface is selectively adjustable relative to the second tab.

In another embodiment, the second contact fitting is a second threaded fastener threadedly coupled to the second tab.

In another embodiment, the second stop further comprises a second contact fitting coupled to the second tab, the second contact fitting having a second contact surface configured to contact the first stop, wherein a position of the second contact surface is selectively adjustable relative to the second tab.

A second representative embodiment of a disclosed aircraft landing gear has a shock strut formed by a rod with a first end slidably disposed within a cylinder. A torque link assembly is positioned on one of a leading (forward) edge and trailing (aft) edge of the shock strut. The torque link assembly includes an upper torque link with a first end rotatably coupled to the cylinder and a lower torque link with a first end rotatable coupled to the rod. The second end of the lower torque link is rotatably coupled to the second end of the upper torque link. The landing gear further includes a truck beam rotatably coupled to a second end of the rod. The truck beam is configured to have a forward wheel and an aft wheel rotatably mounted thereto. A link assembly is positioned on the other of the leading edge and the trailing edge of the shock strut and includes an upper link, a lower link, and a limiter. The upper link has a first end rotatably connected to the cylinder, and the lower link has a first end rotatably connected to the beam. The second ends of the upper and lower links are rotatably coupled to each other, and the limiter limits rotation of the upper link relative to the lower link. The landing gear further includes a biasing element configured to bias the second end of the lower link toward the shock strut.

In another embodiment, the truck beam positioner is located forward of the shock strut.

In another embodiment, the torque link assembly is positioned aft of the shock strut.

In another embodiment, the biasing element comprises a tension spring having a first end coupled to the cylinder and a second end coupled to the lower link of the truck beam positioner.

In another embodiment, the limiter is selectively adjustable to provide a predetermined maximum distance between the first end of the upper link and the first end of the lower link.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

FIGS. 1-4 illustrate a first representative embodiment of a landing gear 100 in accordance with the present disclosure. The landing gear 100 includes a shock strut 102 rotatably connected to structure of an aircraft (not shown).

As used herein, "rotatably" coupled, mounted, connected, etc., indicates that the referenced components are associated in such a way that rotational movement of one component relative to the other component is provided. Typically this rotation is about an axis of rotation that has a fixed position relative to the two components, however, embodiments in which the axis of rotation is moveable relative to one or both components are possible. It will also be appreciated that in some contemplated embodiments, the connection of the components may allow for relative rotational movement between the components that is about a point rather than about an axis of rotation, i.e., the components pivot relative to each other.

Figure 1:
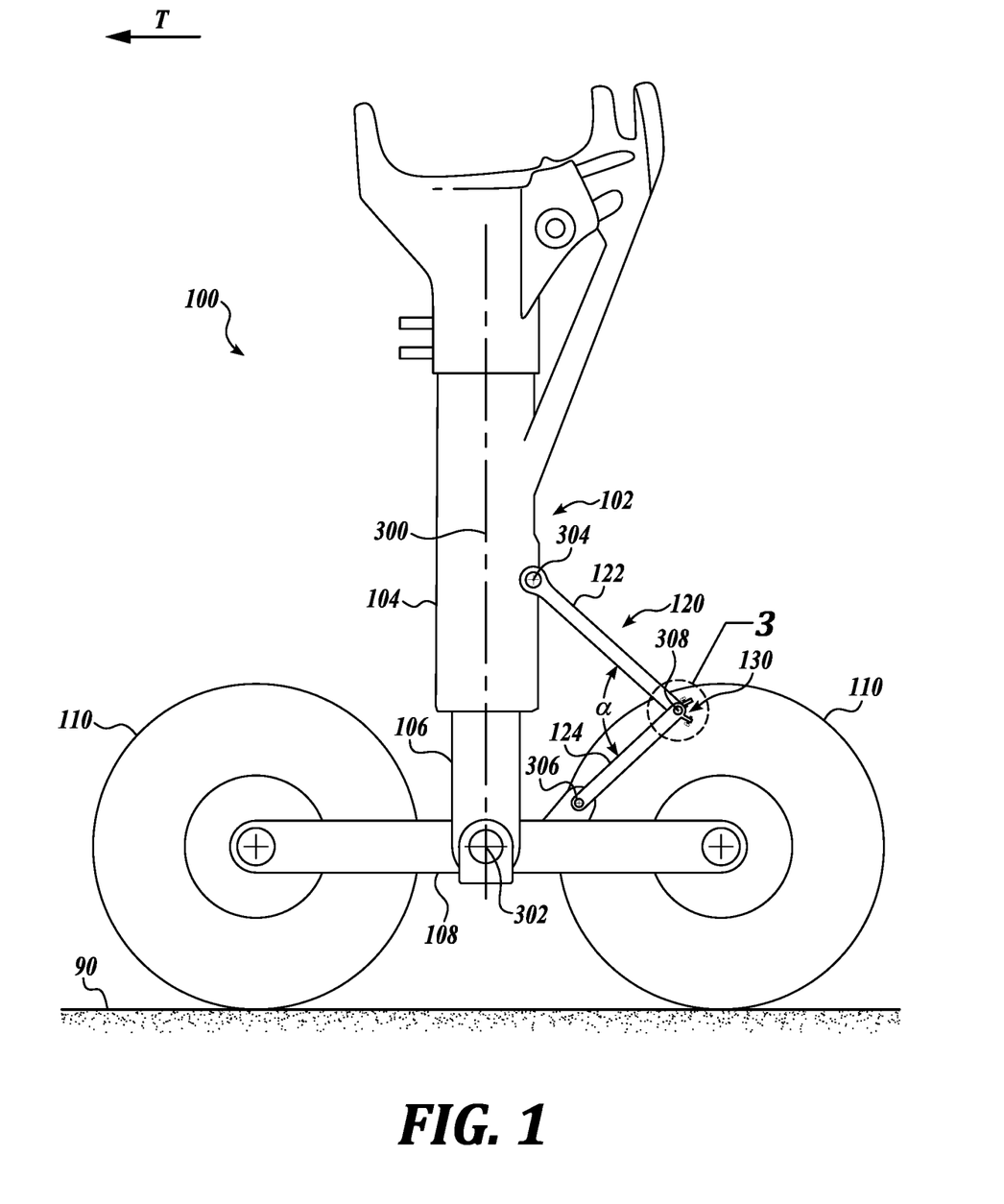
FIG. 1 is a side view of a first representative embodiment of a landing gear for an aircraft according to the present disclosure, wherein the aircraft is on the ground.

An actuation system (not shown) is connected to the shock strut 102 to reciprocate the shock strut, and thus the landing gear, between a gear-up, i.e., stowed, position, employed during flight, and a gear-down, i.e., deployed, position, used during takeoff (FIG. 2), landing (FIG. 2), and ground operations (FIG. 1).

Figure 2:
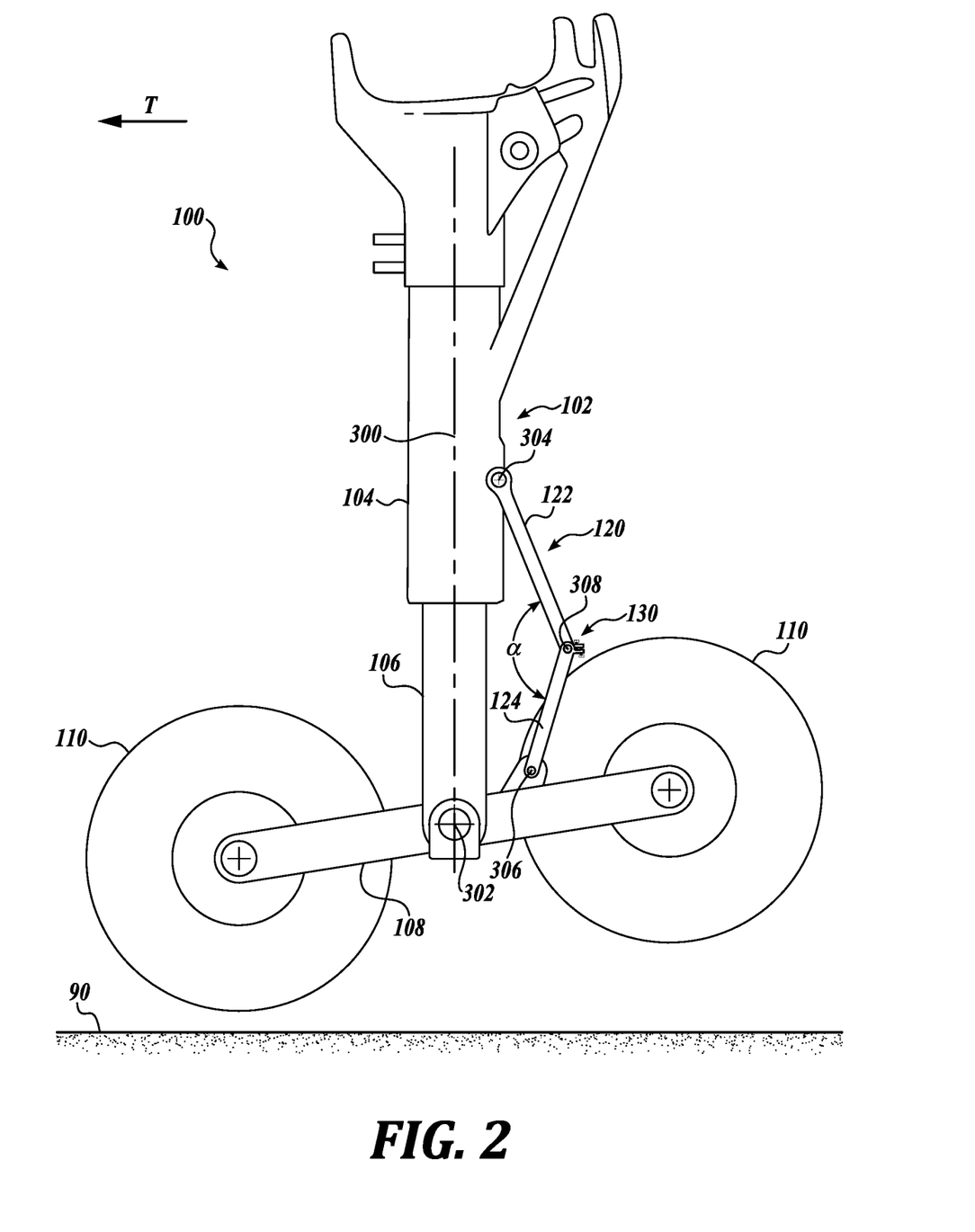
FIG. 2 is a side view of the landing gear shown in FIG. 1, wherein the aircraft is in a takeoff or landing condition.

As best shown in FIGS. 1 and 2, the shock strut 102 includes a cylinder 104 and a rod 106, a portion of which is slidably disposed within the cylinder along centerline 300. That is, the cylinder 104 and the rod 106 share a common centerline 300, with the rod extending from the cylinder. The interior wall of the cylinder 104 engages the outer surface of the rod 106 to restrict translational movement of the rod relative to the cylinder in all directions except along the centerline 300. As a result, the rod 106 is capable of sliding translational movement relative to the cylinder 104 along the direction of the centerline 300. The cylinder 104 and rod 106 cooperate to act as a shock absorber.

The landing gear 100 also includes a truck beam 108 that is rotatably coupled to a lower end of the rod 106 about an axis 302. A plurality of wheels 110 are rotatably attached to the each end of the truck beam 108.

The landing gear 100 further includes a link assembly 120 connecting the cylinder 104 to the truck beam 108. As will be described in further detail, the link assembly 120 acts as a truck beam positioner that ensures the truck beam 108 and wheels 110 maintain a predetermined position relative to the shock strut 102 when the aircraft is airborne and, in particular, in a gear-down condition.

The link assembly 120 includes an elongate upper link 122 rotatably coupled at an upper end to the cylinder 104 about an axis 304, and an elongate lower link 124 rotatably coupled at a lower end to the truck beam 108 about an axis 306. In the embodiment shown, the lower end of the upper link 122 is rotatably coupled to the upper end of the lower link 124 by a limiter joint 130 about an axis 308. Axes 304, 306, and 308 are generally horizontal and parallel to each other. As a result, as the rod 106 moves out of the cylinder 104, the link assembly 120 moves in a scissoring motion so that an angle α between the upper link 122 and lower link 124 increases. Similarly, the angle α decreases as the rod 106 moves further into the cylinder 104.

Figure 3:
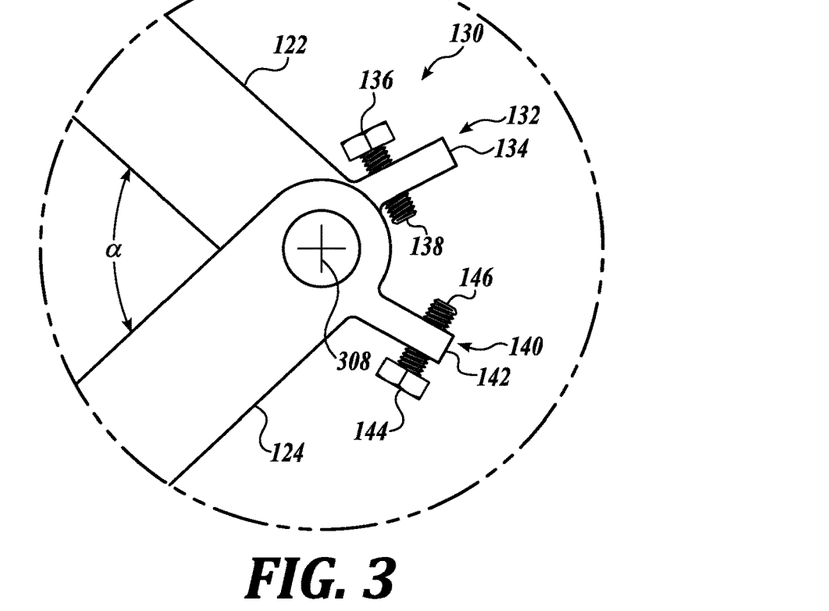
FIG. 3 is a detailed view of one representative embodiment of a limiter joint of the landing gear shown in FIG. 1.
Figure 4:
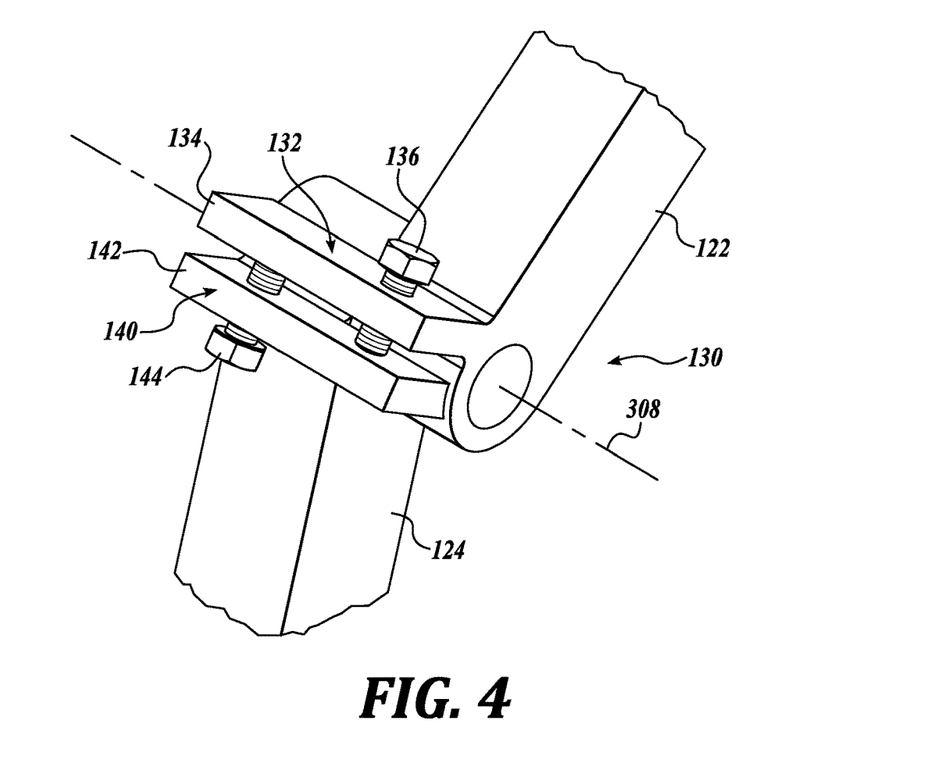
FIG. 4 is an isometric view of the limiter joint shown in FIG. 3.

Referring now to FIGS. 3 and 4, the limiter joint 130 will be described in more detail. As shown in FIGS. 3 and 4, the limiter joint 130 includes a first stop 132 associated with the upper link 122 and a second stop 140 associated with the lower link 124. In the embodiment shown, the first stop 132 is formed by a first tab 134 that extends outwardly in a radial direction from the upper link 122 and a first contact fitting 136 extending through the first tab toward the second stop 140. The second stop 140 is similarly formed, having a second tab 142 that extends outwardly in a radial direction from the lower link 124 and a second contact fitting 144 extending through the second tab 142 toward the first stop 132.

As the upper link 122 and the lower link 124 rotate relative to each other about axis 308 such that the angle α increases, the first stop 132 moves toward the second stop 140. In this regard, the first stop 132 and the second stop 140 contact each other when the angle α reaches the predetermined maximum value, at which point the contact between the stops prevents further rotation of the links 122, 124 relative to each other.

In the illustrated embodiment, contact between the first and second stops 132, 140 occurs when a first contact surface 138 of the first contact fitting 136 contacts the second tab 142 and a second contact surface 146 of the second contact fitting 144 contacts the first tab 134. In some embodiments, the contact fittings 136 and 144 may include threaded bodies. The threaded engagement of the contact fittings with their respective tabs provides for adjustment of the position of the contact surfaces relative to their respective tabs by rotating the contact fittings. This adjustability allows for selective adjustment of the angle α between the upper and lower links 122, 144 achieved when the first and second stops 132, 140 contact each other. This adjustability also enables an operator to ensure that both contact surfaces 138, 146 are in contact with the opposing tab 134, 142 when the upper link 122 and lower link 124 are at the maximum predetermined angle α relative to each other.

In the illustrated embodiment, the contact fittings are a pair of threaded fasteners. It will be appreciated that variations in the number and location of the contact fittings are possible. Further, alternate embodiments that utilize alternate structure to limit the maximum angle between the upper link 122 and lower link 124 are possible, and such alternatives may be adjustable or fixed. In this regard, any suitable configuration that limits the maximum angle between the upper link 122 and lower link 124 may be utilized, and such configurations should be considered within the scope of the present disclosure.

Referring back to FIG. 1, when the aircraft is on the ground, the wheels 110 are in contact with the ground 90, which establishes the position of the truck beam 108. The weight of the airplane compresses the shock strut 102 so that the rod 106 is in a retracted position relative to the cylinder 104. In this position, the link assembly 120 acts as a typical torque link to restrict rotation of the truck beam 108 and, thus, the wheels 110 and rod 106, relative to the cylinder 104 about axis 300.

FIG. 2 shows the aircraft airborne and traveling in the direction of arrow T, with the landing gear 100 in a gear-down position. With the weight of the aircraft off of the shock strut 102, the weight of the truck beam 108 and wheels 110, as well as the energy stored in the shock strut 102, cause the rod 106 to move downward relative to the cylinder 104 into an extended position. As the rod 106 moves toward the extended position, the angle α between the upper link 122 and the lower link 124 increases as a result of the increase in the distance between axis 304, which remains fixed relative to the cylinder 104, and axis 306, which moves downward with the truck beam 108. The angle α increases until it reaches a predetermined maximum value, at which point the limiter joint 130 prevents further rotation of the upper link 122 and the lower link 124 relative to each other. This, in turn, effectively fixes the maximum length of the link assembly 120, i.e., the distance between axis 304 and axis 306. With this length effectively fixed, further downward extension of the rod 106 causes the truck beam 108 to rotate into a "toe down" position, in which the forward end of the truck beam 108 is lower than the aft end of the truck beam 108.

In the airborne gear-down position, the link assembly 120 positions the truck beam 108 relative to the shock strut 102 so that the landing gear 100 can be received within the landing gear bay of the aircraft. Aerodynamic loads act on the wheels 110 of the landing gear to bias the forward end of the truck beam 108 counter-clockwise as viewed in FIGS. 1 and 2, biasing the landing gear 100 toward the toe down position. These loads help to maintain the truck beam 108 in the airborne deployed position (1) when the aircraft is landing but the wheels have not yet touched down, and (2) as the landing gear retracts into the landing gear bay.

As previously noted, FIGS. 1 and 2 show a landing gear 100 with a toe down configuration and with the airplane traveling from right to left. Thus the link assembly 120 is located aft of the shock strut 102. In some aircraft, landing gear bay limitations and landing gear configurations make it necessary for the landing gear to have a "toe up" configuration in which the truck beam 108 is angled relative to the shock strut 102 so that the forward end of the truck beam is higher than the aft end. Such a configuration is possible with the present landing gear configuration by repositioning the link assembly 120 to be located forward of the shock strut 102, i.e., a mirror image of the link assembly positioning shown in FIGS. 1 and 2.

Figure 5:
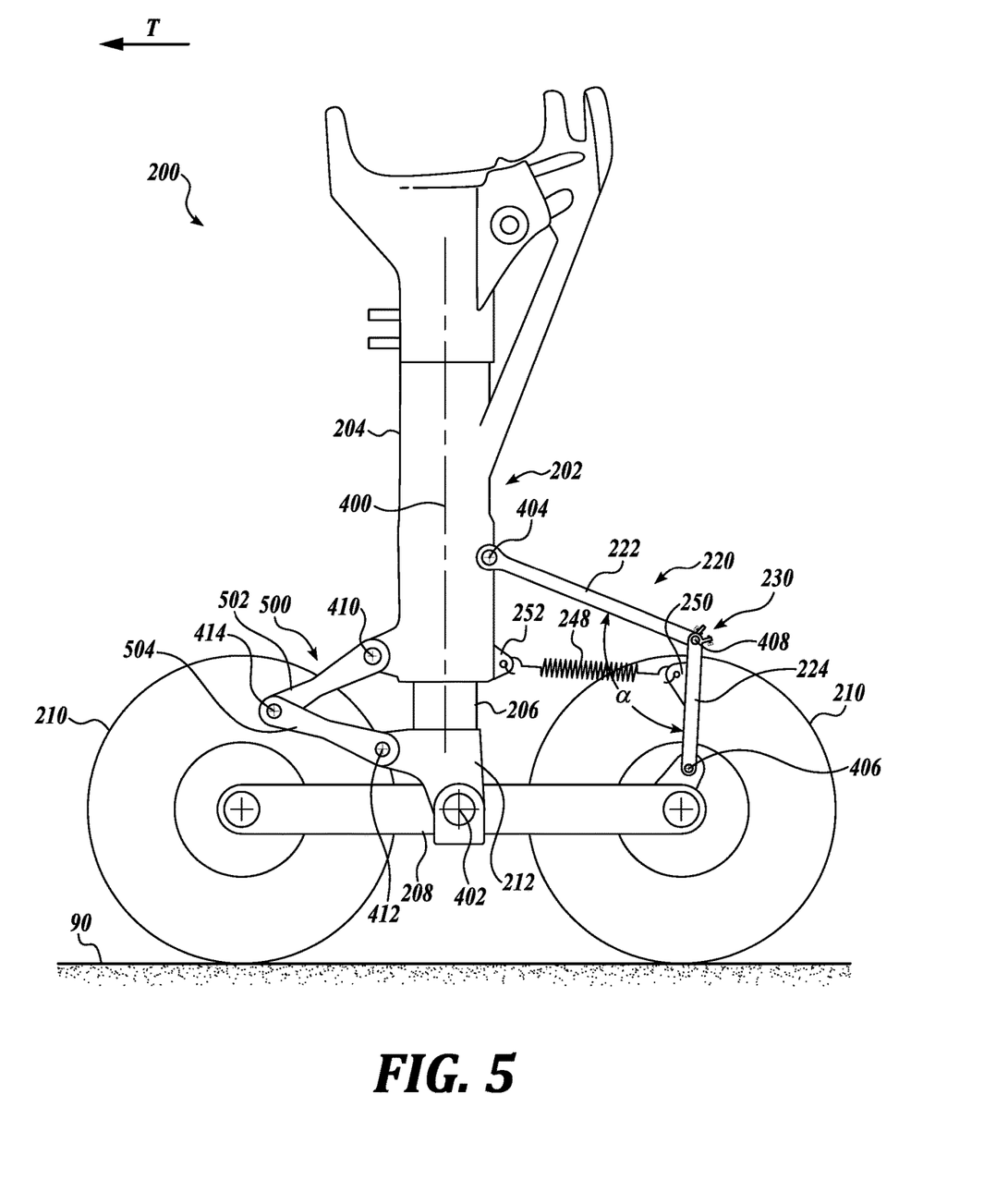
FIG. 5 is a side view of a second representative embodiment of a landing gear for an aircraft according to the present disclosure, wherein the aircraft is on the ground.
Figure 6:
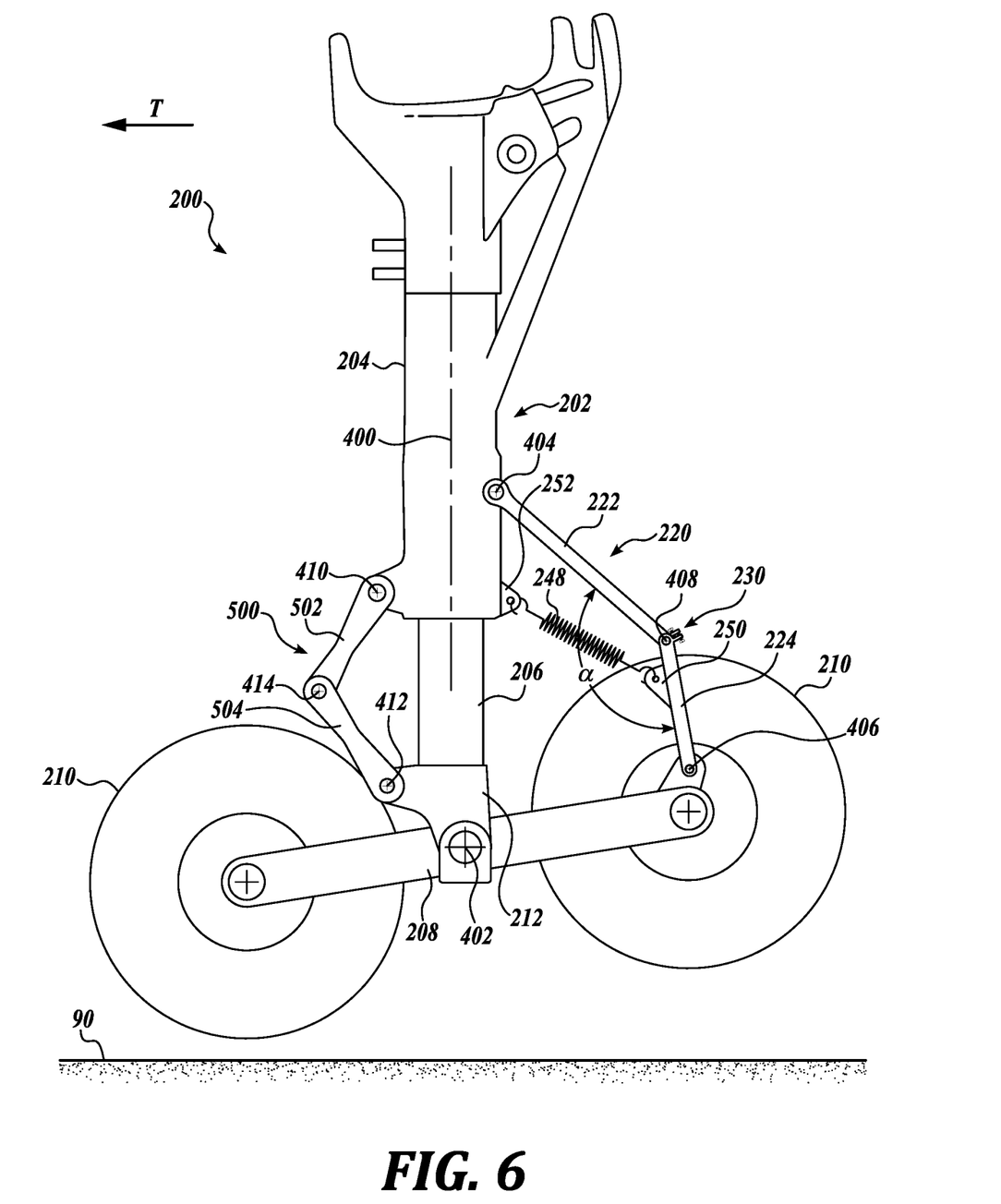
FIG. 6 is a side view of the landing gear shown in FIG. 5, wherein the aircraft is in a takeoff or landing condition.

Referring now to FIGS. 5 and 6, a second representative embodiment of a landing gear 200 according to the present disclosure will be described. For the sake of brevity, unless specifically noted, previously described features of the first embodiment shown in FIGS. 1 and 2 that are also present in FIGS. 5 and 6 will not be described again. For such features, a reference number indicated by 1XX or 3XX in FIGS. 1 and 2 corresponds to a reference number 2XX or 4XX, respectively, in FIGS. 5 and 6. For example, except as otherwise noted, the shock strut 102 and the axis 300 shown in FIGS. 1 and 2 correspond to the shock strut 202 and the axis 400, respectively, shown in FIGS. 5 and 6.

In the illustrated embodiment, the landing gear 200 includes a link assembly 220 positioned aft of the shock strut 202. An elongate upper link 222 of the link assembly 220 is rotatably coupled at an upper end to the cylinder 204 about an axis 404, and an elongate lower link 224 of the link assembly 220 is rotatably coupled at a lower end to the truck beam 208 about an axis 406. The lower end of the upper link 222 is rotatably coupled to the upper end of the lower link 224 by a limiter joint 230 about an axis 408.

In the embodiment shown, biasing element 248 biases the link assembly 220 toward the maximum effective length, i.e. towards the position in which the angle α is its maximum value as determined by the limiter joint 230. That is, the biasing element urges the axis 408 toward the shock strut 202. In the illustrated embodiment, the biasing element is a tension spring 248 coupled at one end to a lug 250 on the lower link 224 of the link assembly 220. A second end of the spring 248 is coupled to a lug 252 on the shock strut 202.

Although the illustrated biasing element 248 is shown as a tension spring, it will be appreciated that any number of configurations may be employed to urge the axis 408 toward the shock strut 202. In one contemplated embodiment, the biasing element is a torsion spring that biases the upper link 222 to rotate relative to the shock strut 202 about axis 404 or the lower link 224 relative to the truck beam 208 about axis 406. Additional, embodiments are also contemplated in which multiple biasing elements are utilized, such as various combinations of one or more tension springs and/or torsion springs. These and other configurations to urge axis 408 toward the shock strut 202 are contemplated and should be considered within the scope of the present disclosure.

Still referring to FIGS. 5 and 6, a torque link assembly 500 can be provided and is positioned forward of the shock strut 202. The torque link assembly 500 includes an elongate upper torque link 502 rotatably coupled at an upper end to cylinder 204 about an axis 410 and an elongate lower torque link 504 rotatably coupled at lower end to a truck beam fitting 212 about an axis 412. The lower end of the upper torque link 502 is rotatably coupled to the upper end of the lower torque link about an axis 414. The truck beam fitting 212 is fixedly coupled to the rod 206 and rotatably coupled to the truck beam 208 about axis 402.

As with known torque link assemblies, axes 410, 412, and 414 are generally parallel, allowing the torque link assembly 500 to move in a scissoring motion to accommodate movement of the rod 206 as the rod extends from and retracts into the cylinder 204. At the same time, the torque link assembly 500 prevents rotation of the rod 206, and therefore the truck beam 208, about axis 400 relative to the cylinder 204.

It will be appreciated that the inclusion of the torque link assembly 500 on the forward side of the shock strut 202 allows for a more lightweight and compact link assembly 220 on the aft side of the shock strut. Because the torque link assembly 500 reacts most of the forces tending to rotate the rod 206 and truck beam 208 about axis 400, the link assembly 220 can be sized and configured mainly for maintaining the orientation of the truck beam 208 when the aircraft is airborne. It will be further appreciated that alternate embodiments are possible in which the torque link assembly 500 is omitted, similar to the embodiment of FIGS. 1-4, so that the link assembly 220 maintains the orientation of the truck beam 208 while also preventing rotation of the rod 206 about axis 400.

As shown in FIG. 5, when the aircraft is on the ground, the ground 90 establishes the position of the truck beam 208, and the shock strut 202 is compressed under the weight of the aircraft. The torque link assembly 500, and to a much lesser extent the link assembly 220, restrict rotation of the truck beam 208 relative to the cylinder 204 about axis 400.

As shown in FIG. 6, when the aircraft is airborne and traveling in the direction of arrow T with the landing gear 200 in a gear-down position, the shock strut 202 is in an extended position. The link assembly 220 and the associated limiter joint 230 operate to position the truck beam in a toe down position, similar to the embodiment of FIGS. 1-4. However, the embodiment of FIGS. 5 and 6 uses the biasing element 248 in addition to the aerodynamic loads acting on the wheels 110 to bias the forward end of the truck beam 208 counter-clockwise as viewed in FIGS. 5 and 6, thereby biasing the landing gear 100 toward the toe down position.

Similar to the embodiment of FIGS. 1-4, the landing gear 200 shown in FIGS. 5 and 6 can be configured to provide a toe up position by positioning the link assembly 220 forward of the shock strut 202 and the torque link assembly 500 aft of the shock strut.

In the description above, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

It should be noted that for purposes of this disclosure, terminology such as "upper," "lower," "vertical," "horizontal," "inwardly," "outwardly," "inner," "outer," "forward," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft landing gear, comprising:
   a shock strut including a rod with a first end slidably disposed within a cylinder;
   a beam rotatably coupled to a second end of the rod, the beam being configured to have a forward wheel and an aft wheel rotatably mounted thereto; and
   a link assembly, comprising:
      an upper link having a first end rotatably connected to the cylinder;
      a lower link having a first end rotatably connected to the beam, a second end of the lower link being rotatably coupled to a second end of the upper link; and
      a limiter comprising a first stop associated the upper link and a second stop associated with the lower link, the first stop engaging the second stop to limit rotation of the upper link relative to the lower link, wherein the limiter is selectively adjustable to provide a predetermined maximum distance between the first end of the upper link and the first end of the lower link.

2. The landing gear of claim 1, further comprising a biasing element coupled to the link assembly and configured to urge the second end of the lower link toward the shock strut.

3. The landing gear of claim 1, wherein the link assembly is positioned aft of the shock strut.

4. The landing gear of claim 1, wherein the first stop comprises a first tab extending from the upper link, and the second stop comprises a second tab extending from the lower link.

5. The landing gear of claim 4, wherein the second stop further comprises a second contact fitting coupled to the second tab, the second contact fitting having a second contact surface configured to contact the first stop, wherein a position of the second contact surface is selectively adjustable relative to the second tab.

6. The landing gear of claim 4, wherein the first stop further comprises a first contact fitting coupled to the first tab, the first contact fitting having a first contact surface configured to contact the second stop, wherein a position of the first contact surface is selectively adjustable relative to the first tab.

7. The landing gear of claim 6, wherein the first contact fitting is a first threaded fastener threaddedly coupled to the first tab.

8. The landing gear of claim 6, wherein the second stop further comprises a second contact fitting coupled to the second tab, the second contact fitting having a second contact surface configured to contact the first stop, wherein the position of the second contact surface is selectively adjustable relative to the second tab.

9. The landing gear of claim 8, wherein the second contact fitting is a second threaded fastener threadedly coupled to the second tab.

10. An aircraft landing gear, comprising:
a shock strut including a rod with a first end slidably disposed within a cylinder;
a torque link assembly located one of forward and aft of the shock strut, the torque link assembly comprising:
an upper torque link having a first end rotatably coupled to the cylinder; and
a lower torque link having a first end rotatably coupled to the rod and a second end rotatably coupled to a second end of the upper torque link;
a beam rotatably coupled to a second end of the rod, the beam being configured to have a forward wheel and an aft wheel rotatably mounted thereto; and
a truck beam positioner located one of forward and aft of the shock strut, the truck beam positioner comprising:
an upper link having a first end rotatably connected to the cylinder;
a lower link having a first end rotatably connected to the beam, a second end of the lower link being rotatably coupled to a second end of the upper link;
a limiter configured to limit rotation of the upper link relative to the lower link, wherein the limiter is selectively adjustable to provide a predetermined maximum distance between the first end of the upper link and the first end of the lower link; and
a biasing element configured to bias the second end of the lower link toward the shock strut.

11. The landing gear of claim 10, wherein the truck beam positioner is located forward of the shock strut.

12. The landing gear of claim 10, wherein the torque link assembly is positioned aft of the shock strut.

13. The landing gear of claim 10, wherein the biasing element comprises a tension spring having a first end coupled to the cylinder and a second end coupled to the lower link of the truck beam positioner.

* * * * *

UNITED STATES PATENT AND TRADEMARK OFFICE
CERTIFICATE OF CORRECTION

| | |
|---|---|
| PATENT NO. | : 11,091,252 B2 |
| APPLICATION NO. | : 16/526645 |
| DATED | : August 17, 2021 |
| INVENTOR(S) | : J. Ning et al. |

Page 1 of 1

It is certified that error appears in the above-identified patent and that said Letters Patent is hereby corrected as shown below:

In the Claims

| Column | Line | |
|---|---|---|
| 8 | 29 | change "associated the" to -- associated with the -- |

Signed and Sealed this
Fifteenth Day of August, 2023

Katherine Kelly Vidal
*Director of the United States Patent and Trademark Office*